(12) United States Patent
Shih

(10) Patent No.: US 9,921,933 B2
(45) Date of Patent: Mar. 20, 2018

(54) SYSTEM AND METHOD FOR INDICATOR LIGHT CONTROL OF STORAGE DEVICES

(71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 65 days.

(21) Appl. No.: 14/931,388

(22) Filed: Nov. 3, 2015

(65) Prior Publication Data

US 2017/0123954 A1    May 4, 2017

(51) Int. Cl.
| G06F 11/00 | (2006.01) |
| G06F 11/32 | (2006.01) |
| G06F 11/07 | (2006.01) |
| G06F 11/16 | (2006.01) |
| G06F 11/30 | (2006.01) |

(52) U.S. Cl.
CPC .......... *G06F 11/325* (2013.01); *G06F 11/079* (2013.01); *G06F 11/1612* (2013.01); *G06F 11/3034* (2013.01); *G06F 2201/84* (2013.01)

(58) Field of Classification Search
CPC .... G06F 11/3034; G06F 11/32; G06F 11/324; G06F 11/325; G06F 11/326; G06F 2201/84; G06F 13/385; G06F 3/0605; G08B 5/36; G08B 5/38

See application file for complete search history.

(56) References Cited

U.S. PATENT DOCUMENTS

| 7,098,801 B1 * | 8/2006 | Burness | G06F 11/325 340/691.1 |
| 7,154,407 B2 * | 12/2006 | Sokol | G05B 19/042 340/500 |
| 8,103,801 B1 * | 1/2012 | Sardella | G06F 11/325 710/1 |
| 8,830,611 B1 * | 9/2014 | Chen | G06F 11/3034 360/31 |
| 9,146,823 B2 * | 9/2015 | Mondal | G06F 11/221 |
| 9,367,510 B2 * | 6/2016 | Dhandapani | G06F 13/4282 |
| 9,460,042 B2 * | 10/2016 | Iskandar | G06F 13/4031 |
| 2005/0149658 A1 * | 7/2005 | Martin | G06F 13/385 710/302 |
| 2008/0040005 A1 | 2/2008 | Breed | |
| 2009/0021383 A1 * | 1/2009 | Garcia | G08B 5/38 340/641 |

(Continued)

FOREIGN PATENT DOCUMENTS

| TW | 523217 U | 3/2003 |
| TW | I293121 B | 2/2008 |

OTHER PUBLICATIONS

Taiwanese Office Action for Application No. 105100887, dated Feb. 21, 2017, w/ First Office Action Summary.

*Primary Examiner* — Marc Duncan
(74) *Attorney, Agent, or Firm* — Nixon Peabody LLP; Eduardo J. Quinones

(57) ABSTRACT

Embodiments generally relate to status indicator control of a computing system. The present technology discloses techniques that enable sufficient and complex display patterns of indicators such as LEDs to interoperate states of storage devices including SSDs. Aspects of the present technology also relate to storage devices connected by a system bus such as peripheral component interconnect express (PCIe).

23 Claims, 7 Drawing Sheets

(56) References Cited

U.S. PATENT DOCUMENTS

2009/0303073 A1* 12/2009 Gilling .................. G06F 1/1626
   340/815.45
2016/0140011 A1* 5/2016 Yeung ................... G06F 11/325
   710/10

* cited by examiner

IBPI Summary Table

| SGPIO-SDATAOUT bit | ODn 0 (Activity) | ODn 1 (Locate) | ODn 2 (Fail) | 2 LEDS/SLOT | | 3 LEDS/SLOT | | |
|---|---|---|---|---|---|---|---|---|
| | | | | Activity LED | Status LED | Activity LED | Locate LED | Fail LED |
| Description: | | | | | | | | |
| Drive Not Present | X | X | X | OFF | X | OFF | X | X |
| Drive Present, No Activity | 0 | X | X | ON | X | ON | X | X |
| Drive Present, Activity | 1 | X | X | 4Hz | X | 4Hz | X | X |
| Locate (Identify) | X | 1 | 0 | 4Hz | 4Hz | X | 4Hz | OFF |
| Fail | X | 0 | 1 | X | ON | X | OFF | ON |
| Rebuild | X | 1 | 1 | X | 1Hz | X | OFF | 1Hz |
| Rebuild | X | X | 1Hz | X | 1Hz | X | OFF | 1Hz |
| PFA | X | X | 2Hz | X | 2 Fast Blinks at 4Hz & Pause for 0.5 sec | X | X | 2 Fast Blinks at 4Hz & Pause for 0.5 sec |
| Hotspare | X | X | 4Hz | X | X | X | X | X |
| In A Critical Array | X | 1Hz | X | X | X | X | X | X |
| In A Failed Array | X | 2Hz | X | X | X | X | X | X |
| (Undefined) | X | 4Hz | X | X | X | X | X | X |

*FIG. 3*

SYSTEM AND METHOD FOR INDICATOR LIGHT CONTROL OF STORAGE DEVICES

FIELD OF THE DISCLOSURE

The disclosure relates generally to indicator control of a computing system. More specifically, certain embodiments of the technology relate to a method and system for controlling indicator patterns related to storage devices.

BACKGROUND

Status indicators such as Light-emitting diodes (LEDs) can interpret states of drives or slots on a backplane. States for drives or slots include, for example, active, empty, failed, rebuilding, etc. The state of a drive or slot is traditionally determined by the host bus adapter, and is typically transmitted to the backplane through Serial General Purpose Input/Output (SGPIO) signals. For example, in a storage device hot-removal process which does not require a system shut-down, a LED can turn off to indicate that a storage drive is powered off, making it safe to be removed from the system.

The International Blinking Pattern Interpretation (IBPI) is an internal computer hardware standard defined by the Small Form Factor committee (SFF). The IBPI defines the rules to interpret SGPIO into states for drives or slots on a backplane. In addition, the IBPI also provides the display patterns for the LEDs to represent these states.

However, since it is based on earlier technologies, the IBPI lacks sufficient specifications for interpreting the numerous states of solid state drives (SSDs), which have became a popular storage choice due to its excellent performance.

SUMMARY

Aspects of the present technology relate to techniques that enable sufficient and complex display patterns of indicators to interpret states of computer components. Aspects of the present technology also relate to storage devices connected by a system bus such as the peripheral component interconnect express (PCIe) bus.

According to some embodiments, the present technology relates to a system for generating, using a first control logic, a first control signal operable to control an indicator light associated with a component, generating, using a second control logic, a second control signal operable to control the indicator light associated with the component, receiving, using a first combinational logic such as a first multiplexer, the first control signal and the second control signal, selecting, at the first combinational logic one value stored in an ownership register to yield a selected control signal, and controlling a display pattern of the indicator light using the selected control signal.

According to some embodiments, the present technology relates to a system, comprising a processor and a memory device comprising instructions that perform instructions comprising: generating one or more signals using a plurality of pattern generators, the one or more signals being associated with a plurality of storage devices, receiving, at a pattern control combinational logic (e.g., a pattern control logic), the one or more signals, selecting, at the pattern control combinational logic, one of the one or more signals based at least in part on at least one value stored in a pattern control register to yield a selected control signal, and controlling a display pattern of an indicator light using the selected control signal, the display pattern of the indicator light corresponding to one of the plurality of storage device states.

According to some embodiments, the present technology relates to a computer-implemented method, comprising: generating, using a peripheral component interconnect express hot-plug control logic, a first control signal operable to control a light-emitting diode associated with a solid state drive, generating, using a peripheral component interconnect express light-emitting diode control logic, a second control signal operable to control the light-emitting diode associated with the solid state drive, receiving, using a first combinational logic (e.g., a first multiplexer), the first control signal and the second control signal, selecting, at the first combinational logic, one of the first control signal and the second control signal based at least in part on at least one value stored in a peripheral component interconnect express ownership register to yield a selected control signal, and controlling a display pattern of the light-emitting diode using the selected control signal.

According to some embodiments, the present technology can provide a PCIe SSD LED display system including a PCIe switch or a PCIe root complex device that can include a number of PCIe slots for connecting to SSDs. Each PCIe slot is associated two or three LEDs to interpret the slot's or the drive's present state. The PCIe switch or the PCIe root complex device can include one or more SSD controllers that are operable to manage the SSDs. The PCIe switch or the PCIe root complex device can further include a LED pattern manager to generate LED light control signals for controlling the LED display patterns.

According to some embodiments, the present technology can provides a PCIe LED ownership register that is operable to reconcile the control conflict between the PCIe hot-plug LED control logic and the PCIe SSD LED control logic; the present technology can provide a PCIe SSD LED pattern control register that is operable to provide the LED display patterns corresponding to a variety of SSD states pursuant to the industry specification.

Additionally, even though the present discussion uses a solid state drive as examples of a storage device, the present technology is applicable to other data storage devices such as hard disk drives (HDDs) or flash drives, or a hybrid of various types of data storage device.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings:

FIG. 3 is an IBPI summary table that summarizes two or three LEDs implementations for SATA/SAS-based storage devices;

DETAILED DESCRIPTION

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

Solid state drives (SSDs) are widely adopted in cloud computing infrastructures for their significant performance advantages such as excellent resistance to physical shock and reduced data access time. Particularly, SSDs provide higher data throughput and lower latency over spinning hard disk drives (HDDs). SSDs can communicate with a host system with various interfaces such as the Serial ATA Express (SATA) bus, the Serial-attached SCSI (SAS) bus, the Peripheral Component Interconnect Express (PCIe) bus, or a combination of various system interfaces. Among these interfaces, the PCIe bus is a high-speed serial computer I/O (Input/Output) system bus that, by utilizing point-to-point serial lines instead of a shared parallel bus architecture, can provide high-bandwidth and low-latency data transmission. As such, the PCIe system bus offers an ideal interface to fully take advantage of the performance improvement offered by the SSDs.

However, as a relative new storage technology, PCIe SSDs face the hurdle of lacking sufficient industry-standard specifications. For example, being directly driven by a PCIe controller, PCIe SSDs cannot utilize the traditional storage LED control interface designed for legacy adapters such as SATA/SAS host bus adapter (HBA). One popular proposal is to leverage the existing PCIe hot-plug control circuit for the SSD LED control.

Although the PCIe hot-plug control circuit provides the hardware capability to perform the PCIe SSDs LED control, the PCIe hot-plug control circuit proposal encounters two main problems: 1) its original PCIe hot-plug controller driver can conflict with the new PCIe LED control driver over control of the same LEDs; and 2) the original hot-plug LED patterns are not sophisticated enough for the numerous and complex LED patterns defined by industry specifications, such as SFF-8489 IBPI.

Thus, there is a need to provide a method and system to realize the IBPI LED patterns for PCIe SSDs.

Figure 1:
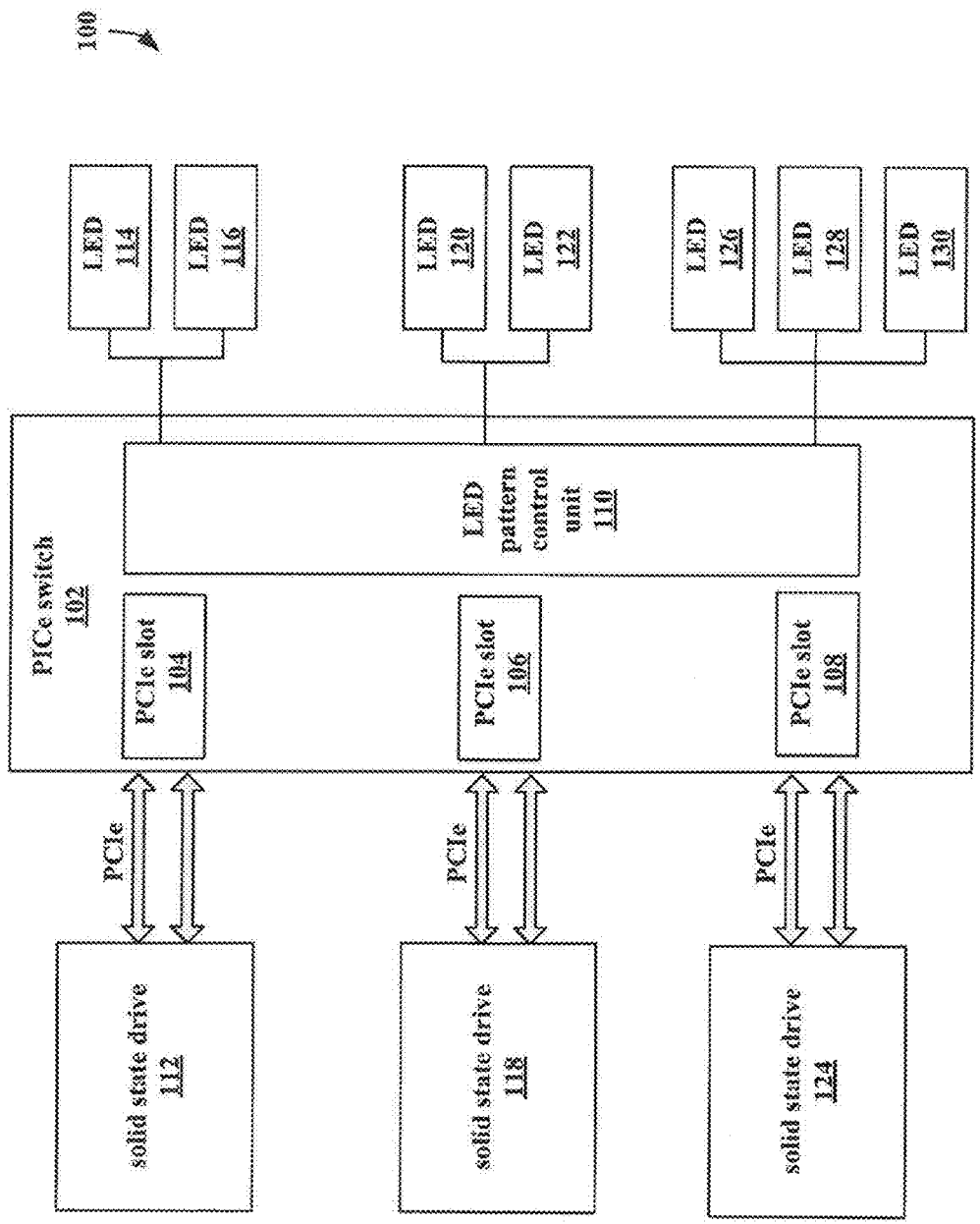
FIG. 1 is a schematic block diagram illustrating an example of a PCIe SSD LED display system, according to some embodiments.

FIG. 1 is a schematic block diagram illustrating an example of a PCIe SSD LED display system for SSDs. It should be appreciated that the system topology in FIG. 1 is an example, and any numbers of SSDs, LEDs and other computer components may be included in the system of FIG. 1.

A PCIe SSD LED display system 100 can include a PCIe switch 102 (or a PCIe root complex device), which is connected to a group of SSDs including, for example, solid state drive 112, solid state drive 118 and solid state drive 124. As shown in FIG. 1, each PCIe slot (e.g., PCIe slot 104, PCIe slot 106 or PCIe slot 108) on PCIe switch 102 can be associated with two or three LEDs. For example, PCIe slot 104 corresponds to LED 114 and LED 116;

PCIe slot 106 corresponds to LED 120 and LED 122; and PCIe slot 108 corresponds to LED 126, LED 128 and LED 130.

Solid state drive 112 can use integrated circuit assemblies as memory to store data. Solid state drive 112 can include, without being limited to, a volatile cache (not shown) and a non-volatile storage (not shown) for data storage. Additionally, the present technology can be applied to other storage medium operable to store program instructions or data for a period of time. For example, the storage medium can be a flash drive, a HDD, or a combination thereof.

PCIe switch 102 (or a PCIe root complex device) can include a central processing unit (CPU) and an application-specific integrated circuit (ASIC) that is operable to provide the data switching function. (not shown). PCIe switch 102 can further include PCIe slot 104, 106 and 108, each of which is operable to connect to a respective solid state drive. According to some embodiments, PCIe switch 102 can include one or more SSD controllers that are operable to manage the SSDs. (not shown). PCIe switch 102 can further include a LED pattern control unit 110 to generate LED light control signals representing states of a SSD, as explained in the following specification. Additionally, the present technology can be applied to other switching devices operable to provide data switching functions for the storage devices.

Figure 2B:
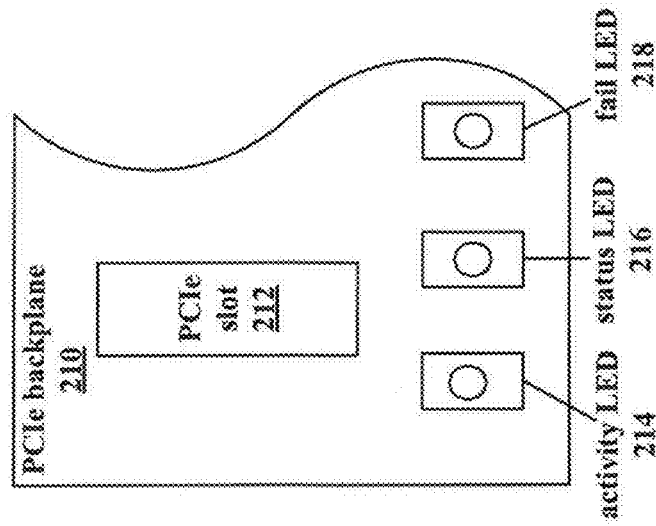
FIG. 2B is another schematic diagram illustrating a section of a backplane with three LEDs related to a SSD.
Figure 2A:
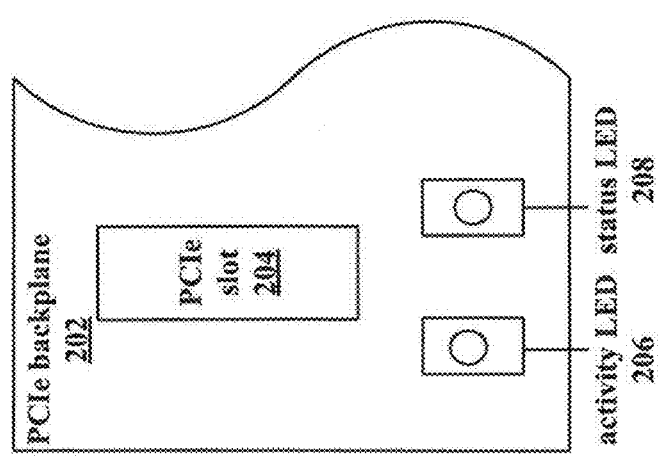
FIG. 2A is a schematic diagram illustrating a section of a backplane with two LEDs related to a SSD.

FIG. 2A is a schematic diagram illustrating a section of a backplane with two LEDs for a SSD slot. PCIe backplane 202 can be any circuit board having connectors and power circuitry. PCIe backplane 202 can connected to a mother board or hosting system by a system bus such as Inter-Integrated Circuit (I2C) or System Management Bus (SM-Bus). PCIe backplane 202 can include a PCIe backplane controller such as a PCIe switch, which can determine the state of a drive or a slot.

PCIe backplane 202 can include a PCIe slot 204 for connecting a SSD. PCIe slot 204 can be associated with two LEDs that can operate in multiple display patterns such as colors and blinking patterns to indicate its present state. The state information of a drive or slot is transmitted to the backplane through 4 SGPIO electrical signals including a SClock signal, a SLoad signal, a SDataout signal and a SDataIn signal, which are generated by PCIe backplane 202. The GPIO signal control technology is well known by those skilled in the art so that further description thereof is unnecessary.

In a two-LED implementation illustrated in FIG. 2A, one LED can be an activity LED and another can be a status LED, both of which can indicate a drive/slot state using different display patterns such as colors and blinking frequency. For example, for an On pattern, activity LED 206 can turn on to indicate that a drive is present without activity; for an Off pattern, activity LED can turn off to indicate that a drive is not present; for an Activity pattern, activity LED 206 can flash at a predetermined frequency, e.g., 4 Hz, to indicate a drive is present and active; for a Locate pattern activity, LED 206 can flash at a predetermined frequency to indicate an identified drive.

Status LED 208 can associate with several display patterns to indicate a drive/slot state. For example, for a Locate pattern, status LED 208 can simultaneously flash with activity LED 206 at a predetermined frequency (e.g., 4 Hz) to indicate an identified drive; for a Fail pattern, status LED 208 can turn on to indicate that a drive has failed; for a Rebuild pattern, status LED 208 can flash at another predetermined frequency (e.g., 1 Hz) to indicate that a rebuild of a drive; for a predicted-to-fail-soon (PFA) pattern, status LED 208 can operate in a predetermined pattern (e.g., two fast blinks followed by a brief pause) to indicate that a drive is still working but predicted to fail soon.

FIG. 2B is a schematic diagram illustrating a section of a backplane with three LEDs for a SSD slot. PCIe backplane 210 can include a PCIe slot 212 for connecting a drive such as a SSD. PCIe slot 212 can be associated with three LEDs that can operate in multiple display patterns such as colors and blinking patterns to indicate its present state.

According to a three-LED implementation illustrated in FIG. 2B, in addition to an activity LED (e.g., activity LED 214), one LED can be a status LED (e.g., status LED 216) and another can be a fail LED (e.g., fail LED 218). For example, for a Locate pattern, locate LED 216 can flash at a predetermined frequency (e.g., 4 Hz) to indicate that a drive has been identified. For example, for a PFA pattern, fail LED 218 can operate in a predetermined pattern (e.g., two fast blinks followed by a brief pause) to indicate that a drive is still working but predicted to fail soon.

FIG. 3 is an IBPI summary table that summarizes two or three LEDs implementations that were defined for storage devices. The IBPI summary table specifies the SGPIO interpretations to represent a slot/drive's active state. As described herein, the PCIe SSD LED display system of the present technology can provide complex LED display patterns defined in the table.

Figure 4:
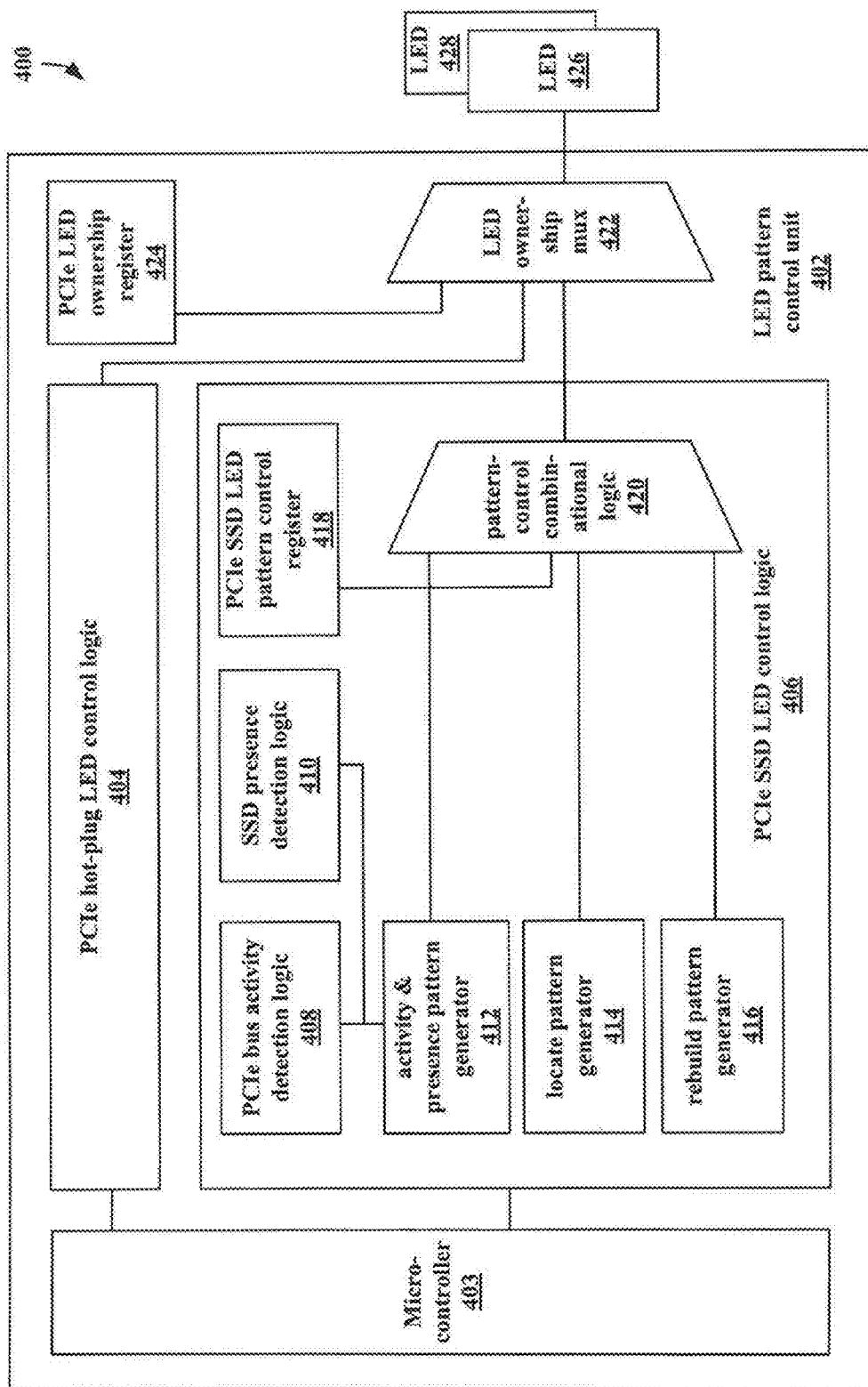
FIG. 4 is another schematic block diagram illustrating an example of a PCIe SSD LED display system, according to some embodiments.

FIG. 4 is another schematic block diagram illustrating an example of a PCIe SSD LED display system 400. It should be appreciated that the topology in FIG. 4 is an example, and any numbers of control units may be included in the system of FIG. 4.

PCIe SSD LED display system 400 can include a LED pattern control unit 402 and a LED 426. LED pattern control unit 402 can be a control circuit operable to control LED 426, according to the present technology. As illustrated in FIG. 4, LED pattern control unit 402, comprising multiple control logics, registers, and one or more microcontrollers (e.g., Microcontroller 403), is operable to 1) reconcile the control conflict between the PCIe hot-plug LED control logic 404 and the PCIe SSD LED control logic 406 by using a PCIe LED ownership register 424; and 2) enrich the LED display patterns to the level defined by the IBPI summary table in FIG. 3, by using a PCIe SSD LED pattern control register 418. LED pattern control unit 402 can include any hardware components and software instructions to execute the requisite LED control functions.

Microcontroller 403 can be any embedded controller embedded that is operable to read sensor data, receive external signals, generate signals such as input data signals and clock signals and drive external devices such as LED 426. Additionally, more than one microcontrollers can be utilized, according to the present technology.

LED pattern control unit 402 can include PCIe hot-plug LED control logic 404 and PCIe SSD LED control logic 406, each of which can be any circuit and control logic that is operable to generate conflicting signals to control the display pattern of LED 426. For example, PCIe hot-plug LED control logic 404 can include a hot-plug LED control driver that is operable to generate a control signal for LED 426. PCIe SSD LED control logic 406 can include a SSD control driver that is operable to generate another control signal for LED 426.

According to some embodiments, each of PCIe hot-plug LED control logic 404 and PCIe SSD LED control logic 406 is configured to respectively control a separate LED, e.g., LED 426 and 428 According to some embodiments, PCIe hot-plug LED control logic 404 and PCIe SSD LED control logic 406 are configured to jointly control a single LED such as LED 426.

To determine a control signal for LED 426, PCIe LED ownership register 424 can store a set of values to determine which LED control logic should currently control LED 426. According to some embodiments, a basic input/output system (BIOS) can detect the hardware configuration during a booting process and determine the set of register values. PCIe LED ownership register 424 can be any processor register that is operable to store ownership data. For example, PCIe LED ownership register 424 is operable to store value data for determining one of the three scenarios: 1) the LED is disabled; 2) the LED is controlled by the PCIe hot-plug control logic; and 3) the LED is controlled by the PCIe SSD LED control logic.

An ownership combinational logic such as LED ownership multiplexer (mux) 422 is operable to receive the respective control signal from PCIe hot-plug LED control logic 404 and PCIe SSD LED control logic 406. Based on the value stored in PCIe LED ownership register 424, LED ownership mux 422 is then set to select the control logic (404 or 406) to be utilized to control a display pattern of LED 426.

In addition to managing a shared LED 426 controlled by PCIe hot-plug LED control logic 404 and PCIe SSD LED control logic 406, LED ownership mux 422 is operable to manage a respective and dedicated LED light for each of the PCIe hot-plug LED control logic 404 and PCIe SSD LED control logic 406. For example, PCIe hot-plug LED control logic 404 is associated with a dedicated LED 426 and PCIe SSD LED control logic 406 is associated with a dedicated LED 428. As explained earlier in the specification, the display pattern of LED 426 can operate in one of an on pattern, an off pattern, or various flash patterns that are associated with a respective flash frequency or a specific length of time. For example, when LED 426 is an activity LED, it can 1) turn on to indicate that a SSD is present without activity in an On pattern; 2) turn off to indicate that a SSD is not present in an Off pattern; 3) flash at a predetermined frequency, e.g., 4 Hz, to indicate a SSD is present and active in an Activity pattern, or 4) flash at a predetermined frequency to indicate an identified drive in a Locate pattern.

Further, each of the display patterns can correspond to a present state of the SSD or the slot. The state can be, for example, an activity and presence state of the SSD, a locate state of the SSD, a fail state of the SSD, a rebuild state of the SSD or a PFA state of the SSD. For example, As shown in FIG. 4, multiple pattern generators are operable to generate corresponding electrical signals to indicate a present state of the SSD. For example, activity and presence generator 412, by receiving data from PCIe bus activity detection logic 408 and SSD presence detection logic 410, can generate an activity and presence signal to indicate that the SSD is in an activity and presence state. Similarly, locate pattern generator 414 can generate a locate signal to indicate that the SSD is in a locate state. Rebuild pattern generator 416 can generate a rebuild signal to indicate that the SSD is in a rebuild state. Additionally, a PFA pattern generator can generate a PFA signal to indicate that the SSD is in a PFA state (not shown). Additionally, other pattern generators can be used to generate the corresponding signals to indicate a present state of the SSD.

A LED pattern control combinational logic 420, e.g. a LED pattern control logic, is operable to receive the respective control signal from the multiple pattern generators. To provide enriched LED display patterns, LED pattern control combinational logic 420 can communicate with PCIe SSD LED pattern control register 418, which can store values for determining a LED's present state. According to some embodiments, a basic input/output system (BIOS) can detect the hardware configuration during a booting process and determine the set of register values. PCIe SSD LED pattern control register 418 can be any processor register that is operable to store pattern control data. For example, PCIe SSD LED pattern control register 418 can include values to determine one of the several scenarios: 1) the SSD is in an activity and presence state; 2) the SSD is in a locate state; 3) the SSD is in a fail state; 4) the SSD is in a rebuild state; and 5) the SSD is in a PFA state.

Using values stored in PCIe SSD LED pattern control register 418, LED pattern control combinational logic 420 is operable to select a LED pattern control signal based on the received signals, which can consequently control a display pattern of LED 426.

As explained earlier in the specification, the display pattern of LED 426 can operate in one of an on pattern, an off pattern, or various flash patterns, each of which is associated with a respective flash frequency or a specific length of time. For example, when LED 426 is a status LED, it can simultaneously flash with another activity LED at a predetermined frequency (e.g., 4 Hz) to indicate a SSD in a Locate pattern. LED 426 can turn on to indicate that a SSD has failed in a Fail pattern. LED 426 can flash at another predetermined frequency (e.g., 1 Hz) to indicate that a SSD rebuild in a Rebuild pattern. Additionally, LED 426 can operate in a predetermined pattern (e.g., two fast blinks followed by a brief pause) to indicate that a SSD is still working but predicted to fail soon in a PFA pattern.

For example, when LED 426 is a locate LED, it can flash at a predetermined frequency (e.g., 4 Hz) to indicate that a SSD has been identified in a Locate pattern. LED 426 can operate in a predetermined pattern (e.g., two fast blinks followed by a brief pause) to indicate that a SSD is still working but predicted to fail soon in a PFA pattern.

Further, each of the display patterns of LED 426 can correspond to a present state of the SSD or the slot. The state can be, for example, an activity and presence state of the SSD, a locate state of the SSD, a fail state of the SSD, a rebuild state of the SSD or a PFA state of the SSD.

According to some embodiments, the LED pattern control signal selected d by pattern control combinational logic 420 can transmit to LED ownership mux 422 for a second multiplexing. For example, with signals fed from PCIe hot-plug LED control logic 404 and PCIe SSD LED control logic 406, LED ownership mux 422 is operable to use PCIe LED ownership register 424 to select a second signal for controlling LED 426.

Figure 5:
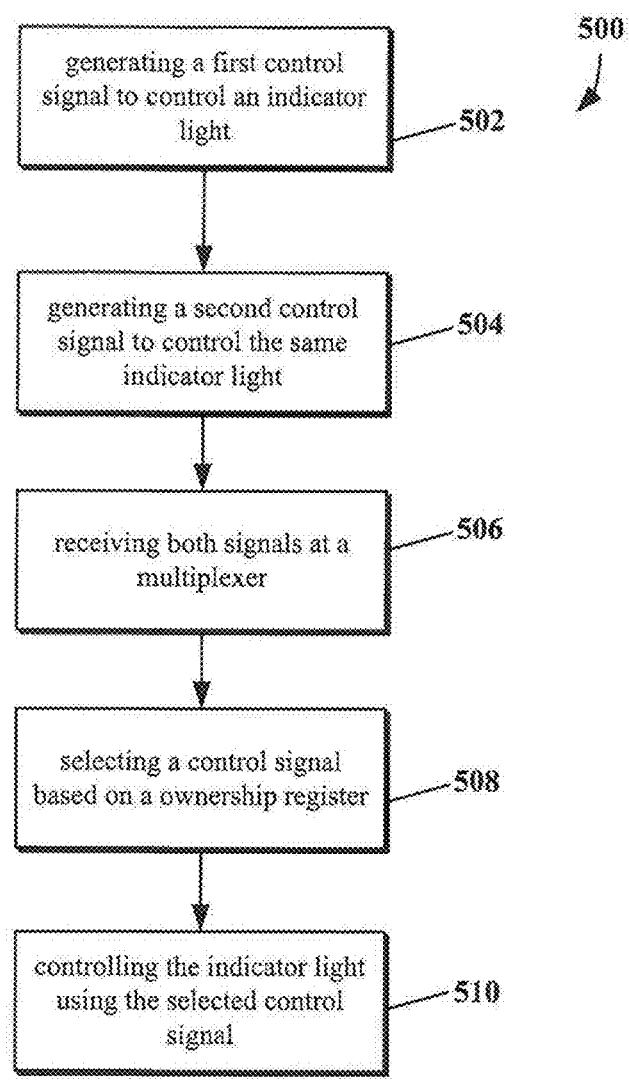
FIG. 5 is an example flow diagram for a PCIe SSD LED display system, according to some embodiments.

FIG. 5 is an example flow diagram for a PCIe SSD LED display system, according to some embodiments. It should be understood that there can be additional, fewer, or alternative steps performed in similar or alternative orders, or in parallel, within the scope of the various embodiments unless otherwise stated.

At step 502, a first control logic can generate a first control signal operable to control an indicator light associated with a component. For example, as illustrated in FIG. 4, LED pattern manager 402 can include PCIe hot-plug LED control logic 404 which can be any circuit and control logic that is operable to generate signals to control the display pattern of LED 426.

At step 504, a second control logic can generate a second control signal operable to control the same indicator light. For example, PCIe hot-plug LED control logic 404 can generate control signals to control the display pattern of LED 426.

At step 506, a first multiplexer can receive the two signals generated by the two control logics. For example, LED ownership multiplexer (mux) 422 is operable to receive the respective control signal from PCIe hot-plug LED control logic 404 and PCIe SSD LED control logic 406.

At step 508, the LED ownership multiplexer can select a control signal from the two received signals based on an ownership register that stores values to determine which control logic controls the indicator light. For example, using PCIe LED ownership register 424, LED ownership mux 422 is operable to select a control signal based on the received signals, which can consequently control a display pattern of LED 426.

PCIe LED ownership register 424 can be any processor register that is operable to store ownership data. For example, PCIe LED ownership register 424 is operable to store value data for determining one of the three scenarios: 1) the LED is disabled; 2) the LED is controlled by the PCIe hot-plug control logic; and 3) the LED is controlled by the PCIe SSD LED control logic.

In addition to managing a shared LED 426 controlled by PCIe hot-plug LED control logic 404 and PCIe SSD LED control logic 406, LED ownership mux 422 is operable to manage a respective and dedicated LED light for each of the PCIe hot-plug LED control logic 404 and PCIe SSD LED control logic 406. For example, PCIe hot-plug LED control logic 404 is associated with a dedicated LED 426 and PCIe SSD LED control logic 406 is associated with a dedicated LED 428.

At step 510, the selected control signal can control the display pattern of the LED. For example, the display pattern of LED 426 can operate in one of an on pattern, an off pattern, or various flash patterns, each of which is associated with a respective flash frequency or a specific length of time. For example, when LED 426 is an activity LED, it can 1) turn on to indicate that a SSD is present without activity in an On pattern; 2) turn off to indicate that a SSD is not present in an Off pattern; 3) flash at a predetermined frequency, e.g., 4 Hz, to indicate a SSD is present and active in an Activity pattern, or 4) flash at a predetermined frequency to indicate an identified SSD in a Locate pattern.

Figure 6:
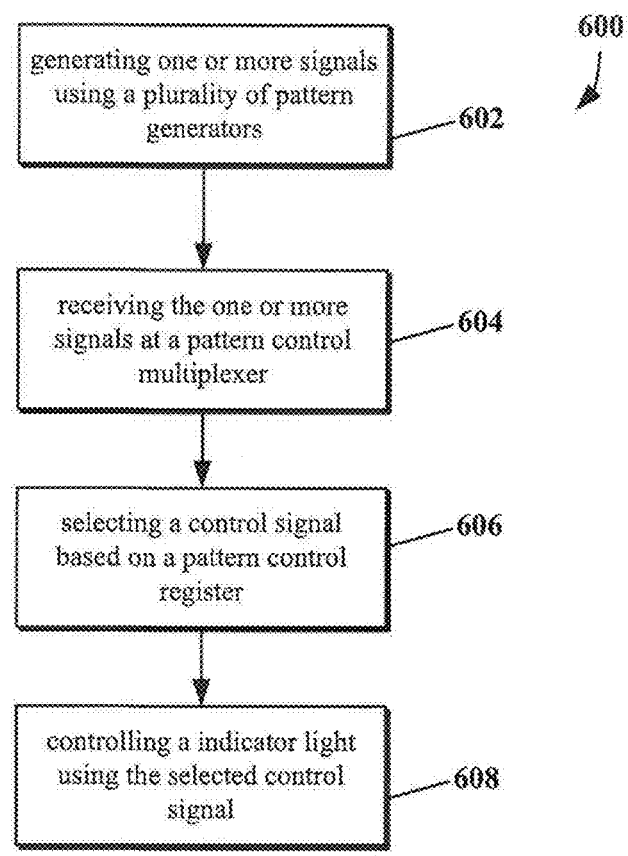
FIG. 6 is another flow diagram for a PCIe SSD LED display system, according to some embodiments.

FIG. 6 is another example flow diagram for an automatic-recovery switch system with switching function high-availability, according to some embodiments. It should be understood that there can be additional, fewer, or alternative steps performed in similar or alternative orders, or in parallel, within the scope of the various embodiments unless otherwise stated.

At step 602, a number of pattern generators are operable to generate one or more signals associated with a plurality of storage device states. For example, as illustrated in FIG. 4, activity and presence generator 412, by receiving data from PCIe bus activity detection logic 408 and SSD presence detection logic 410, can generate an activity and presence signal to indicate that the SSD is in an activity and presence state. Similarly, locate pattern generator 414 can generate a locate signal to indicate that the SSD is in a locate state. Rebuild pattern generator 416 can generate a rebuild signal to indicate that the SSD is in a rebuild state. Additionally, a PFA pattern generator can generate a PFA signal to indicate that the SSD is in a PFA state (not shown). Other pattern generators can be used to generate the corresponding signals to indicate a present state of the SSD.

At step 604, a pattern control logic can receive the one or more signals generated by the pattern generators. For example, LED pattern control combinational logic 420 is operable to receive the respective control signal from the multiple pattern generators.

At step 606, the pattern control logic can select one of the one or more signals based at least in part on at least one values stored in a pattern control register to yield a selected control signal. For example, using PCIe SSD LED pattern control register 418, LED pattern control combinational logic 420 is operable to select a LED pattern control signal based on the received signals, which can consequently control a display pattern of LED 426.

PCIe SSD LED pattern control register 418 can be any processor register that is operable to store pattern control data. For example, PCIe SSD LED pattern control register 418 can include values to determine one of the several scenarios: 1) the SSD is in an activity and presence state; 2) the SSD is in a locate state; 3) the SSD is in a fail state; 4) the SSD is in a rebuild state; and 5) the SSD is in a PFA state.

At step 606, the selected control signal can control a display pattern of an indicator light associated with a storage device. For example, the display pattern of LED 426 can operate in one of an on pattern, an off pattern, or various flash patterns, each of which is associated with a respective flash frequency or a specific length of time. For example, when LED 426 is a status LED, it can simultaneously flash with another activity LED at a predetermined frequency (e.g., 4 Hz) to indicate a SSD in a Locate pattern. LED 426 can turn on to indicate that a SSD has failed in a Fail pattern. LED 426 can flash at another predetermined frequency (e.g., 1 Hz) to indicate that a SSD rebuild in a Rebuild pattern. Additionally, LED 426 can operate in a predetermined pattern (e.g., two fast blinks followed by a brief pause) to indicate that a SSD is still working but predicted to fail soon in a PFA pattern.

According to some embodiments, the selected LED pattern control signal generated by pattern control combinational logic 420 can be transmitted to LED ownership mux 422 for a second multiplexing. For example, with signals fed from PCIe hot-plug LED control logic 404 and PCIe SSD LED control logic 406, LED ownership mux 422 is operable to use PCIe LED ownership register 424 to select a second signal for controlling LED 426.

Figure 7:
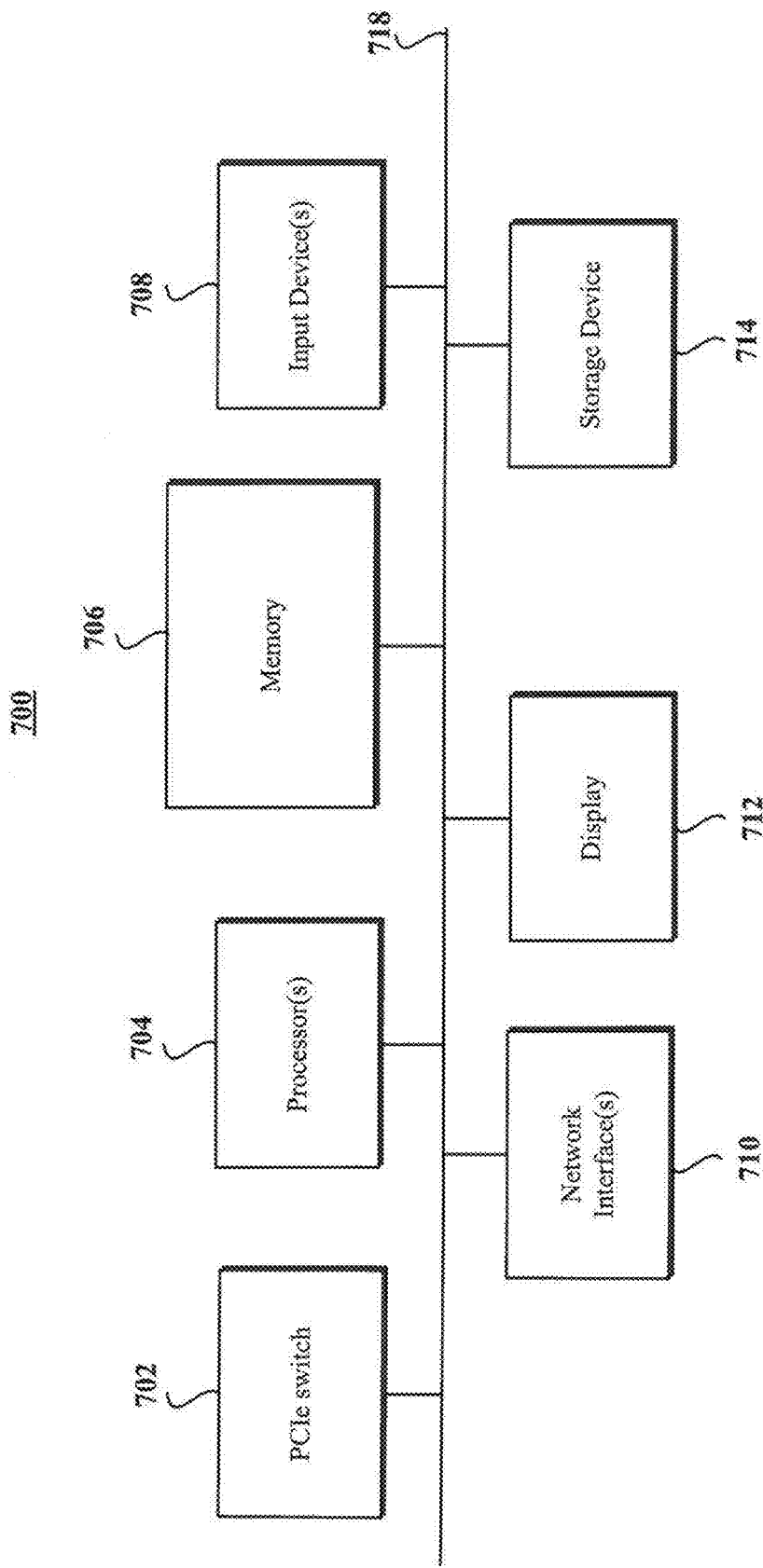
FIG. 7 illustrates a computing platform of a computing device, according to some embodiments.

FIG. 7 illustrates example system architecture 700 for implementing the systems and processes of FIGS. 1-6. Computing platform 700 includes a bus 718 that interconnects subsystems and devices, such as: PCIe switch or PCIe backplane 702, processor 704, system memory 706, input devices 708, a network interface(s) 710, display 712 and storage device 714. Processor 704 can be implemented with one or more central processing units ("CPUs"), such as those manufactured by Intel® Corporation—or one or more virtual processors—as well as any combination of CPUs and virtual processors. Computing platform 700 exchanges data representing inputs and outputs via input-and-output devices input devices 708 and display 712, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing platform 700 performs specific operations by processor 704, executing one or more sequences of one or more instructions stored in system memory 706. Computing platform 700 can be implemented as a server device or client device in a client-server arrangement, peer-to-peer arrangement, or as any mobile computing device, including smart phones and the like. Such instructions or data may be read into system memory 706 from another computer readable medium, such as storage device 714. In some examples, hard-wired circuitry may be used in place of or in combination with software instructions for implementation. Instructions may be embedded in software or firmware. The term "computer readable medium" refers to any tangible medium that participates in providing instructions to processor 704 for execution. Such a medium may take many forms, including, but not limited to, non-volatile media and volatile media. Non-volatile media includes, for example, optical or magnetic disks and the like. Volatile media includes dynamic memory, such as system memory 706.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that include bus 718 for transmitting a computer data signal.

In the example shown, system memory 706 can include various modules that include executable instructions to implement functionalities described herein. In the example shown, system memory 706 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A system for controlling indicator lights associated with a component, comprising:
a processor; and
a memory device comprising instructions that, when executed by the processor, cause the processor to perform instructions comprising:
generating, using a first control logic, a first control signal operable to control an indicator light associated with a component;
generating, using a second control logic, a second control signal operable to control the indicator light associated with the component, wherein generating the second control signal further comprises determining, using a pattern control register, the second control signal based on signals generated by a plurality of pattern generators;
receiving, using a first combinational logic, the first control signal and the second control signal;

selecting, at the first combinational logic, one of the first control signal and the second control signal using an ownership register to yield a selected control signal; and controlling a display pattern of the indicator light using the selected control signal.

2. The system of claim 1, wherein the plurality of pattern generator comprises at least one of an activity and presence pattern generator, a locate pattern generator, a rebuild pattern generator and a predicted failure analysis pattern generator.

3. The system of claim 1, wherein the display pattern of the indicator light comprises one of an on pattern, an off pattern, or one or more flash patterns each associated with a respective flash frequency, and the display pattern of the indicator light corresponds to one of an activity and presence state of the component, a locate state of the component, a fail state of the component, a rebuild state of the component or a predicted failure analysis state of the component.

4. The system of claim 1, wherein the memory device comprising instructions that cause the processor to further perform instructions comprising:
determining, using the ownership register, that the indicator light is disabled.

5. The system of claim 1, wherein the memory device comprising instructions that cause the processor to further perform instructions comprising:
determining, using the ownership register, that the first control logic controls the display pattern of the indicator light.

6. The system of claim 1, wherein the memory device comprising instructions that cause the processor to further perform instructions comprising:
determining, using the ownership register, that the second control logic controls the display pattern of the indicator light.

7. The system of claim 1, wherein the second control logic further comprises a second combinational logic configured to select one of a plurality of signals generated by a plurality of pattern generators using a pattern control register to yield the second control signal.

8. The system of claim 1, wherein the first control logic comprises a peripheral component interconnect express hot-plug control logic, wherein the second control logic comprises a peripheral component interconnect express light-emitting diode control logic, wherein the indicator light comprises a light-emitting diode light, and wherein the component comprises a solid state drive.

9. The system of claim 1, wherein the first combinational logic is operable to control a first display pattern of a first indicator light based on the first control signal, and to control a second display pattern of a second indicator based on the second control signal.

10. A system, comprising:
a processor; and
a memory device comprising instructions that, when executed by the processor, cause the processor to perform instructions comprising:
generating one or more signals using a plurality of pattern generators, the one or more signals being associated with a plurality of storage device states;
receiving, at a pattern control combinational logic, the one or more signals;
selecting, at the pattern control combinational logic, one of the one or more signals using a pattern control register to yield a selected control signal; and
controlling, using the selected control signal, a display pattern of an indicator light associated with a storage device, the display pattern of the indicator light corresponding to one of the plurality of storage device states.

11. The system of claim 10, wherein the display pattern of the indicator light comprises one of an on pattern, an off pattern, or one or more flash statuses each associated with a respective flash frequency.

12. The system of claim 10, wherein the plurality of storage device states comprises an activity and presence state of the storage device, a locate state of the storage device, a fail state of the storage device, a rebuild state of the storage device or a predicted failure analysis state of the storage device.

13. The system of claim 10, wherein the plurality of pattern generator comprises at least one of an activity and presence pattern generator, a locate pattern generator, a rebuild pattern generator and a predicted failure analysis pattern generator.

14. The system of claim 10, wherein the storage device comprises a solid state drive, wherein the indicator light comprises a light-emitting diode light, and wherein the pattern control register comprises a peripheral component interconnect express light-emitting diode pattern control register.

15. A computer-implemented method, comprising:
generating, using a peripheral component interconnect express hot-plug control logic, a first control signal operable to control a light-emitting diode associated with a solid state drive;
generating, using a peripheral component interconnect express light-emitting diode control logic, a second control signal operable to control the light-emitting diode associated with the solid state drive;
receiving, using a first multiplexer, the first control signal and the second control signal;
selecting, at the first multiplexer, one of the first control signal and the second control signal using a peripheral component interconnect express ownership register to yield a selected control signal; and
controlling a display pattern of the light-emitting diode using the selected control signal.

16. The method of claim 15, wherein generating the second control signal further comprises:
determining, using a peripheral component interconnect express light-emitting diode pattern control register, the second control signal based on signals generated by a plurality of pattern generators.

17. The method of claim 16, wherein the plurality of pattern generator comprises at least one of an activity and presence pattern generator, a locate pattern generator, a rebuild pattern generator and a predicted failure analysis pattern generator.

18. The method of claim 15, wherein the display pattern of the light-emitting diode comprises one of an on pattern, an off pattern, or one or more flash patterns each associated with a respective flash frequency, and the display pattern of the light-emitting diode corresponds to one of an activity and presence state of the solid state drive, a locate state of the solid state drive, a fail state of the solid state drive, a rebuild state of the solid state drive or a predicted failure analysis state of the solid state drive.

19. The method of claim 15, further comprising:
determining, using the peripheral component interconnect express ownership register, that the peripheral component interconnect express light-emitting diode control logic control the display pattern of the light-emitting diode.

20. The method of claim 15, wherein the peripheral component interconnect express light-emitting diode control logic further comprises a second control logic configured to generate, using a peripheral component interconnect express light-emitting diode pattern control register, the second control signal based on signals generated by a plurality of pattern generators.

21. A system for controlling indicator lights associated with a component, comprising:
a processor; and
a memory device comprising instructions that, when executed by the processor, cause the processor to perform instructions comprising:
generating, using a first control logic, a first control signal operable to control an indicator light associated with a component;
generating, using a second control logic, a second control signal operable to control the indicator light associated with the component;
receiving, using a first combinational logic, the first control signal and the second control signal;
selecting, at the first combinational logic, one of the first control signal and the second control signal using an ownership register to yield a selected control signal;
determining, using the ownership register, that the indicator light is disabled; and
controlling a display pattern of the indicator light using the selected control signal.

22. A system for controlling indicator lights associated with a component, comprising:
a processor; and
a memory device comprising instructions that, when executed by the processor, cause the processor to perform instructions comprising:
generating, using a first control logic, a first control signal operable to control an indicator light associated with a component;
generating, using a second control logic, a second control signal operable to control the indicator light associated with the component, wherein the second control logic further comprises a second combinational logic configured to select one of a plurality of signals generated by a plurality of pattern generators using a pattern control register to yield the second control signal;
receiving, using a first combinational logic, the first control signal and the second control signal;
selecting, at the first combinational logic, one of the first control signal and the second control signal using an ownership register to yield a selected control signal; and
controlling a display pattern of the indicator light using the selected control signal.

23. A system for controlling indicator lights associated with a component, comprising:
a processor; and
a memory device comprising instructions that, when executed by the processor, cause the processor to perform instructions comprising:
generating, using a first control logic, a first control signal operable to control an indicator light associated with a component;
generating, using a second control logic, a second control signal operable to control the indicator light associated with the component;
receiving, using a first combinational logic, the first control signal and the second control signal, wherein the first combinational logic is operable to control a first display pattern of a first indicator light based on the first control signal, and to control a second display pattern of a second indicator based on the second control signal;
selecting, at the first combinational logic, one of the first control signal and the second control signal using an ownership register to yield a selected control signal; and
controlling a display pattern of the indicator light using the selected control signal.

* * * * *